W. A. CAMPBELL.
VALVE STRUCTURE.
APPLICATION FILED JULY 9, 1913.
1,126,171.
Patented Jan. 26, 1915.
2 SHEETS—SHEET 2.
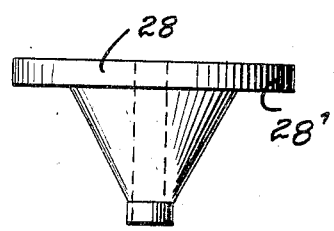
Fig. 4.
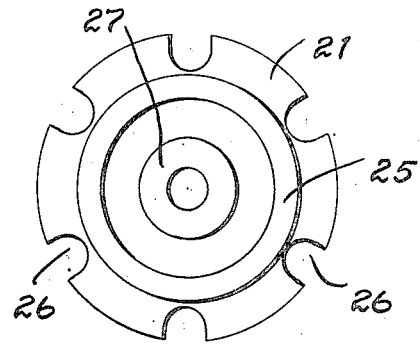
Fig. 5.
Fig. 8.
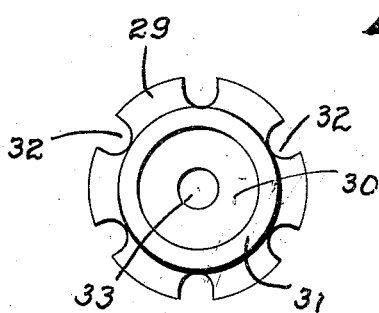
Fig. 6.
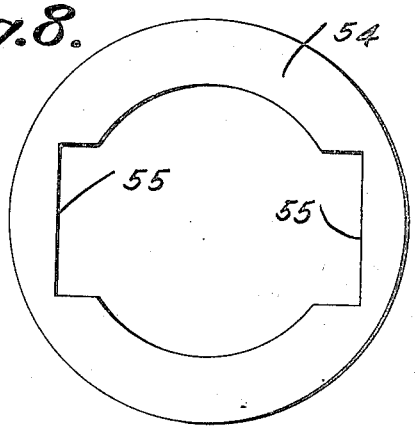
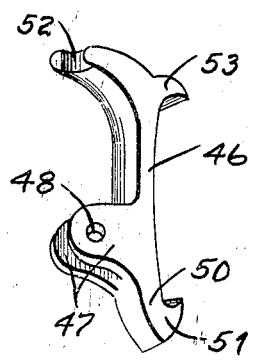
Fig. 7.
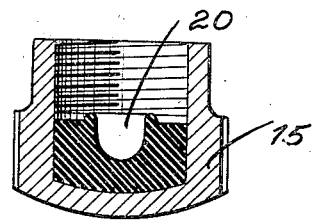
Fig. 9.
Witnesses
M. S. Watson
Inventor
W. A. Campbell
By
Attorneys

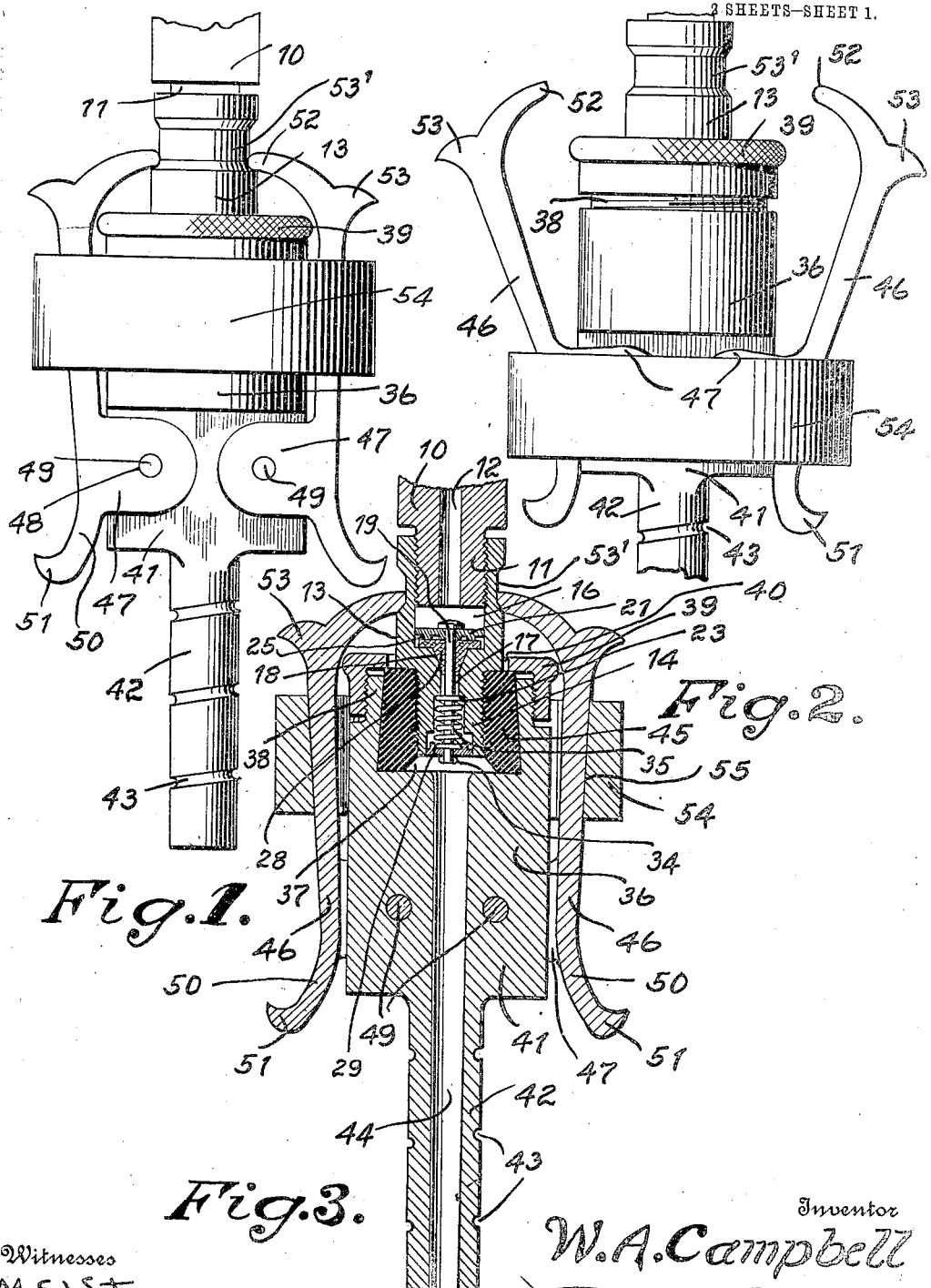

UNITED STATES PATENT OFFICE.

WILLIAM A. CAMPBELL, OF MARICOPA, CALIFORNIA.

VALVE STRUCTURE.

1,126,171.  Specification of Letters Patent.  Patented Jan. 26, 1915.

Application filed July 9, 1913. Serial No. 778,145.

*To all whom it may concern:*

Be it known that I, WILLIAM A. CAMPBELL, a citizen of the United States, residing at Maricopa, in the county of Kern, State of California, have invented certain new and useful Improvements in Valve Structures; and I do hereby declare the following to be a full, clear, and exact description of the invention, such as will enable others skilled in the art to which it appertains to make and use the same.

This invention relates to pneumatic rubber tires and has special reference to an improved inflating valve attachment for such tires.

The principal object of the invention is to provide an improved attachment for the inflating tube of pneumatic tires which is arranged to coöperate with an improved form of coupling for tubes of this description.

Another object of the invention is to improve the form of valve arrangement for such attachment.

A third object of the invention is to improve the form of coupling for use in connection with such attachment.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and:—Figure 1 is a side elevation showing the attachment in position and the coupling locked thereon. Fig. 2 is a similar view showing the coupling in unlocked position. Fig. 3 is an enlarged vertical section through the improved device showing the coupling applied thereto. Fig. 4 is a detail of the valve disk. Fig. 5 is an enlarged detail view of a valve plate used herewith. Fig. 6 is an enlarged detail view of a guide plate used herewith. Fig. 7 is a detail perspective view of one of the gripping levers. Fig. 8 is a detail face view showing a slide used to hold the gripping levers in engaging and release positions. Fig. 9 is a section through the cap used herewith.

This device is intended to be applied to the usual inflating tube 10 which is provided with the ordinary reduced end 11 having a threaded exterior. Through the tube and reduced end extends the passage 12.

The device itself consists of a body 13 having a reduced end 14 threaded exteriorly to receive the cap 15 best shown in Fig. 2 where the parts are separated. This body 13 is provided with a valve chamber 16 and through the reduced end 14 extends a shouldered passage 17 which communicates with the chamber 16. Surrounding the passage 17 where it opens into the chamber 16 is a valve seat 18. Extending through the chamber 16 and passage 17 is a valve stem 19 the outer end of which extends beyond the reduced end 14 and is received in a recess 2—formed in the cap 15. On this valve stem 19 is carried a valve plate 21 which is forced on the stem by suitable pressure so that it forms a rigid connection therewith. On one side of the plate there is provided a rib 25 which is spaced from the periphery of the plate so that air passages formed by notches 26 may be spaced about the periphery of said plate. Surrounding the stem 19 is a boss 27 which is concentric with the rib 25 so that an annular channel is formed between said boss and rib. Pressed onto the valve stem and resting on the plate in this channel is a valve disk 28 which is made of rubber, leather or any suitable fiber and which can readily be replaced when worn. It is to be noted that this valve disk fits the valve seat and is provided with a flange 28′ which rests on the end wall of the chamber 16, being forced against said wall by the rib 25.

Within the chamber 17 is mounted a guide plate 29. This guide plate is provided with a spring seat 30 surrounded by a rib 31. Spaced around the edge of the guide plate are notches forming air passages 32. The stem 19 is slidably mounted within an opening 33 formed in the guide plate and is prevented from disconnection by means of ears 34 punched out on the stem. Loosely surrounding the stem 19 and having its ends received against a shoulder 23 in the passage 17 and the seat 30 is a coil spring 35 which urges the valve to seat.

The coupling device consists of a cylindrical body portion 36 having a frusto-conical chamber 37 formed therein with the minor base forming the mouth of the chamber. The body 36 is reduced around this mouth as at 38 and is provided with an exterior thread so that the retaining cap 39 can be screwed thereon. This retaining cap is provided with an opening 40 centrally disposed to said chamber and is of less diameter than the mouth of the chamber 37. Extending from the body 36 at the end opposite said chamber is a flattened portion 41 which terminates in a cylindrical hose connection 42 provided with annular grooves 43 so that a rubber hose slipped over the connection is held thereon. Extending from the chamber through the extension 41 and connection 42 is a passage 44 for air from a suitable hose. Held within the chamber 37 is a frusto-conical packing 45 having a suitable opening therein for the reception of the extension 14, the opening 40 being of such size that the end of the body 13 can pass therein and butt against said packing 45. This packing is preferably of rubber or the like yieldable and elastic substance. On each side of the body 36 is provided a lever 46 having a pair of arms 47 projecting therefrom and provided with alined perforations 48. These arms 47 straddle the sides of the extension 41 and through the perforation 48 and a suitable perforation on said extension pass the pivot pin 49 so that the levers rock on said pivots. Each of the levers 46 is provided with a tail piece 50 extending at an angle to the body of the lever and terminating in a stop lug 51. Each of these levers is likewise provided with a bifurcated arm 52 arranged to engage a suitable groove 53' formed around the body 13 and opposite to each arm 52 is provided a stop lug 53. Slidably mounted on the levers 46 is a slide ring 54 provided with flattened portions 55 each engaging the respective levers and which prevent turning of the ring thereon. This slide ring is so arranged that when moved toward the lugs 53 the jaws 52 will be forced inward and held in locking position while, when the ring is moved toward the lugs 51 the jaws 52 will be forced open so that the hose may be readily detached.

In the operation of the device the body 13 is screwed onto the reduced end 11 of the body 10. The plate 29 is in this manner limited in its movement in one direction since it bears against the end of said tube. When it is desired to supply air to the tire the ring 54 is moved toward the lugs 51 so that the jaws 52 open. The packing 45 is then forced over the reduced end 14 and the ring 54 slid toward the lugs 53. This forces the arms 52 inward and causes them to tightly engage in the groove 53'. The air is then supplied through the passage 44 and this causes the valve to lift so that air can flow through the notches 26 and 32. When sufficient air has been admitted the spring 35 will reseat the valve and the slide ring may then be moved toward the lugs 51 which will open the arms 52. The coupling can then be pulled off. There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

A valve for devices of the kind described including a valve plate, a boss projecting centrally from one side of said plate, a rib projecting from said side and surrounding said boss in spaced relation to the periphery whereby an annular channel is formed between the boss and last mentioned rib, said plate being provided with notches spaced around the periphery, and a valve disk provided with a flange extending over said rib, said disk being of less diameter than said plate.

In testimony whereof, I affix my signature, in the presence of two witnesses.

WILLIAM A. CAMPBELL.

Witnesses:
  E. E. BALLAGH,
  ROBT. O'ROURKE.

Copies of this patent may be obtained for five cents each, by addressing the "Commissioner of Patents, Washington, D. C."